(12) United States Patent
Harel

(10) Patent No.: US 9,078,218 B1
(45) Date of Patent: Jul. 7, 2015

(54) GAIN MEASUREMENT OF DISTRIBUTED ANTENNA SYSTEM (DAS) SEGMENTS DURING ACTIVE COMMUNICATIONS EMPLOYING AUTOCORRELATION ON A COMBINED TEST SIGNAL AND COMMUNICATIONS SIGNAL

(71) Applicant: CORNING OPTICAL COMMUNICATIONS WIRELESS, LTD, Airport (IL)

(72) Inventor: Dror Harel, Hod Hasharon (IL)

(73) Assignee: Corning Optical Communications Wireless Ltd., Airport (IL)

( * ) Notice: Subject to any disclaimer, the term of this patent is extended or adjusted under 35 U.S.C. 154(b) by 0 days.

(21) Appl. No.: 14/227,215

(22) Filed: Mar. 27, 2014

(51) Int. Cl.
*H04W 24/00* (2009.01)
*H04W 52/24* (2009.01)

(52) U.S. Cl.
CPC .......... *H04W 52/241* (2013.01); *H04W 52/243* (2013.01)

(58) Field of Classification Search
CPC ...... H04W 24/00; H04W 24/08; H04W 88/08
USPC ........ 455/424, 423, 425, 422.1, 403
See application file for complete search history.

(56) References Cited

U.S. PATENT DOCUMENTS

| | | | |
|---|---|---|---|
| 8,428,201 B1 | 4/2013 | McHann et al. | 375/345 |
| 8,428,510 B2 | 4/2013 | Stratford et al. | 455/7 |
| 8,509,850 B2 | 8/2013 | Zavadsky et al. | 455/562.1 |
| 8,532,242 B2 | 9/2013 | Fischer et al. | 375/356 |
| 2006/0019679 A1* | 1/2006 | Rappaport et al. | 455/456.5 |
| 2011/0256863 A1* | 10/2011 | Ramasamy et al. | 455/424 |
| 2012/0052892 A1 | 3/2012 | Braithwaite | 455/501 |
| 2013/0005349 A1* | 1/2013 | Sanders et al. | 455/456.1 |
| 2013/0070816 A1 | 3/2013 | Aoki et al. | 375/219 |
| 2013/0071121 A1 | 3/2013 | Sharapov et al. | 398/79 |
| 2013/0095870 A1 | 4/2013 | Phillips et al. | 455/501 |
| 2013/0252651 A1 | 9/2013 | Zavadsky et al. | 455/501 |
| 2013/0272696 A1 | 10/2013 | Palanisamy et al. | 398/25 |
| 2013/0308693 A1 | 11/2013 | Li et al. | 375/224 |

* cited by examiner

*Primary Examiner* — Nghi H Ly
(74) *Attorney, Agent, or Firm* — C. Keith Montgomery

(57) ABSTRACT

Gain measurement of distributed antenna system (DAS) segments during active communications employing autocorrelation on a combined test signal and communications signal is disclosed. In one embodiment, a test signal is injected into one or more DAS segments in a DAS. The test signal power is measured at the input and output of the DAS segment(s) for which gain measurement is desired. The difference in power of the test signal between the input and the output of the DAS segment is the gain of the DAS segment. The frequency of the test signal is provided to be within the frequency band of the communications service signals supported by the DAS segment. To allow for gain measurement of a DAS segment during active communication periods when the DAS segment is actively transmitting communications service signals, autocorrelation is employed to separate the test signal from combined test signal and communications service signals.

26 Claims, 8 Drawing Sheets

136

| DIGITAL VALUE (137) | POWER(mA) (138) |
|---|---|
| 00000000 | 0 |
| 00000001 | 0.02VA |
| ⋮ | ⋮ |
| 11111110 | 4.98VA |
| 11111111 | 5VA |

*FIG. 4*

GAIN MEASUREMENT OF DISTRIBUTED ANTENNA SYSTEM (DAS) SEGMENTS DURING ACTIVE COMMUNICATIONS EMPLOYING AUTOCORRELATION ON A COMBINED TEST SIGNAL AND COMMUNICATIONS SIGNAL

BACKGROUND

The technology of the present disclosure relates generally to distributed antenna systems (DASs) that support distributing communications services to remote antenna units, and particularly to measuring gain of DAS sub-systems within the DAS.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

It may be desired to measure gain (i.e., attenuation) of the sub-systems of the DAS 12 in FIG. 1 to determine performance degradation. For example, the gain of the central unit 16 and/or the remote antenna unit 14, as DAS sub-systems, may be significantly different from their nominal gain level due to component variance, temperature changes, aging, and/or loading conditions. In this example, the central unit 16 and/or the remote antenna units 14(1)-14(N) may include an attenuator (not shown) that can be adjusted to adjust the actual gain back to the desired nominal gain level. In this regard, as an example, when the DAS 12 in FIG. 1 is first installed and all elements are interconnected and operated, it may be desired to measure the gain of each relevant DAS 12 segment. Corrective actions, such as gain adjustment, can be taken based on the measured gain of the DAS 12 segments. For example, the uplink gain of the remote antenna unit 14(2) in the DAS 12 in FIG. 1 may be measured by injecting a test signal Ts at an uplink input 28(2) and measuring the power of the test signal Ts at the uplink input 28(2) and an uplink output 30(2). So that the test signal Ts is provided in a frequency band that is supported for transmission in the remote antenna unit 14(2), the test signal Ts is provided in a common frequency band with the supported uplink communications signals 20U (i.e., a communications service signal). The uplink gain of the remote antenna unit 14(2) can be determined by subtracting the power of the test signal Ts at uplink input 28(2) from the power of the test signal Ts at the uplink output 30(2).

This method of gain measurement has a significant disadvantage. This method does not allow measuring gain of a DAS segment while the DAS is actively transferring communications service signals. The test signal, being in a common frequency band with a communications service signal, might interfere with the communications service signal. In addition, the communications service signal might disturb the test signal. A test signal in a different frequency band from the supported communications service signals may be employed for gain measurement to prevent the test signal from interfering communications service signals. However, in this scenario, the DAS segment would have to support the additional frequency band of the test signal and employ appropriate filters to filter the test signal from the communications service signals, thus adding additional cost and complexity to the DAS components in the DAS. However, because the gain of the DAS might be different at each frequency due to the frequency dependent response of the DAS components, an accurate gain measurement may only be possible using a test signal that has a frequency in a frequency band of a supported communications service signals in the DAS.

No admission is made that any reference cited herein constitutes prior art. Applicant expressly reserves the right to challenge the accuracy and pertinency of any cited documents.

SUMMARY

Embodiments disclosed herein include gain measurement of distributed antenna system (DAS) segments during active communications employing autocorrelation on a combined test signal and communications signal. Related devices, systems, and methods are also disclosed. In this regard, in one embodiment, a test signal is injected into one or more DAS segments in a DAS. The power of the test signal is measured at the input and output of a given DAS segment for which gain measurement is desired. The difference in power of the test signal between the input and the output of the DAS segment is the gain (or attenuation) of the DAS segment. The frequency of the test signal is provided to be within a frequency band of the communications service signals supported by the DAS segment so that the DAS segment can transmit the frequency band of the communications service signals and can also transmit the test signal. Further, to allow for gain measurement of a DAS segment during active communication periods when the DAS segment is actively transmitting communications service signals, autocorrelation is employed to separate the test signal from combined test signal and communications service signals transmitted by the DAS segment. In this manner, gain measurements of the test signal can be obtained to determine the gain of the DAS segment even though the test signal and communications service signals are combined in the DAS segment.

One embodiment of the disclosure relates to a DAS segment gain measurement system. The DAS segment gain measurement system comprises a signal correlator. The signal correlator is configured to receive a first measurement signal comprising a power-related measurement of a combined test signal and communications service signal at an input node of a DAS segment, the combined test signal of a frequency in a frequency band of the communications service signal. The signal correlator is also configured to receive a test replication signal indicative of the test signal. The signal correlator is also configured to autocorrelate the first measurement signal with the test replication signal to retrieve a first test measurement signal indicative of the power in the test signal at the input node of the DAS segment. The signal correlator is also configured to provide the first test measurement signal at the input node to a controller. The signal correlator is also configured to receive a second measurement signal comprising a power-related measurement of the combined test signal at an output node of the DAS segment. The signal correlator is also configured to autocorrelate the second measurement signal with the test replication signal to retrieve a second test measurement signal indicative of the power in the test signal at the output node of the DAS segment. The signal correlator is also configured to provide the second test measurement signal at the input node to a controller. The DAS segment gain measurement system also comprises a controller. The controller is configured to receive the first test measurement signal. The controller is also configured to receive the second test measurement signal. The controller is also configured to subtract the first test measurement signal from the second test measurement signal to determine a measured gain of the DAS segment. The controller can be configured to adjust the gain of the DAS segment based on the measured gain of the DAS segment.

Another embodiment of the disclosure relates to a method of measuring gain in a distributed antenna system (DAS) segment. The method comprises receiving a first measurement signal comprising a power-related measurement of a combined test signal and communications service signal at an input node of a DAS segment, the combined test signal of a frequency in a frequency band of the communications service signal. The method also comprises receiving a test replication signal indicative of the test signal. The method also comprises autocorrelating the first measurement signal with the test replication signal to retrieve a first test measurement signal indicative of the power in the test signal at the input node of the DAS segment. The method also comprises receiving a second measurement signal comprising a power-related measurement of the combined test signal at an output node of the DAS segment. The method also comprises autocorrelating the second measurement signal with the test replication signal to retrieve a second test measurement signal indicative of the power in the test signal at the output node of the DAS segment. The method also comprises subtracting the first test measurement signal from the second test measurement signal to determine a measured gain of the DAS segment. The method can also comprise adjusting the gain of the DAS segment based on the measured gain of the DAS segment.

Another embodiment of the disclosure relates to DAS. The DAS comprises a plurality of DAS segments each configured to distribute communications service signals by being configured to distribute downlink communications service signals towards a plurality of remote antenna units and distribute uplink communications service signals received from client devices towards a central unit. The plurality of DAS segments each comprising an input node and an output node. The DAS also comprises a test signal generator. The test signal generator is configured to generate a test signal of a frequency in a frequency band of the communications service signals. The test signal generator is also configured to inject the test signal to the input node of the plurality of DAS segments. The DAS also comprises a plurality of power detection circuits each coupled to an input node or an output node of a DAS segment. Each of the plurality of power detection circuits configured to detect a power-related measurement of combined test signal and communications service signal, and provide a measurement signal comprising a power-related measurement of a combined test signal and communications service signal. The DAS also comprises a signal switch. The signal switch is configured to receive a plurality of the measurement signals from each of the plurality of power detection circuits, and selectively provide a measurement signal from a plurality of the power-related measurements of the combined test signal and communications service signals to a gain measurement system. The gain measurement system of the DAS is configured to receive a first measurement signal at an input node of a DAS segment among the plurality of DAS segments.

The gain measurement system is also configured to autocorrelate the first measurement signal with a test replication signal of the test signal to retrieve a first test measurement signal indicative of the power in the test signal at the input node of the DAS segment. The gain measurement system is also configured to receive a second measurement signal at an output node of the DAS segment. The gain measurement system is also configured to autocorrelate the second measurement signal with the test replication signal to retrieve a second test measurement signal indicative of the power in the test signal at the output node of the DAS segment. The DAS also comprises a controller. The controller is configured to subtract the first test measurement signal from the second test measurement signal to determine a measured gain of the DAS segment. The controller may also be configured to adjust the gain of the DAS segment based on the measured gain of the DAS segment.

Additional features and advantages will be set forth in the detailed description which follows, and in part, will be readily apparent to those skilled in the art from the description or recognized by practicing the embodiments as described in the written description and claims hereof, as well as the appended drawings.

The accompanying drawings are included to provide a further understanding and are incorporated in and constitute a part of this specification. The drawings illustrate one or more embodiment(s), and together with the description serve to explain the principles and operation of the various embodiments.

BRIEF DESCRIPTION OF THE DRAWINGS

FIG. 4 is a table provided in an exemplary database in the DAS in FIG. 2 comprising correlated test measurement signal digital values to power levels to be used by the gain measurement system to correlate test measurement signals of power-related measurements of a test signal at nodes in the DAS to power levels;

DETAILED DESCRIPTION

Embodiments disclosed herein include gain measurement of distributed antenna system (DAS) segments during active communications employing autocorrelation on a combined test signal and communications signal. Related devices, systems, and methods are also disclosed. In this regard, in one embodiment, a test signal is injected into one or more DAS segments in a DAS. The power of the test signal is measured at the input and output of a given DAS segment for which gain measurement is desired. The difference in power of the test signal between the input and the output of the DAS segment is the gain (or attenuation) of the DAS segment. The frequency of the test signal is provided to be within the frequency band of the communications service signals supported by the DAS segment, so that the DAS segment can transmit the frequency band of the communications service signals and can also transmit the test signal. Further, to allow for gain measurement of a DAS segment during active communication periods when the DAS segment is actively transmitting communications service signals, autocorrelation is employed to separate the test signal from combined test signal and communications service signals transmitted by the DAS segment. In this manner, gain measurements of the test signal can be obtained to determine the gain of the DAS segment even though the test signal and communications service signals are combined in the DAS segment.

Figure 1:
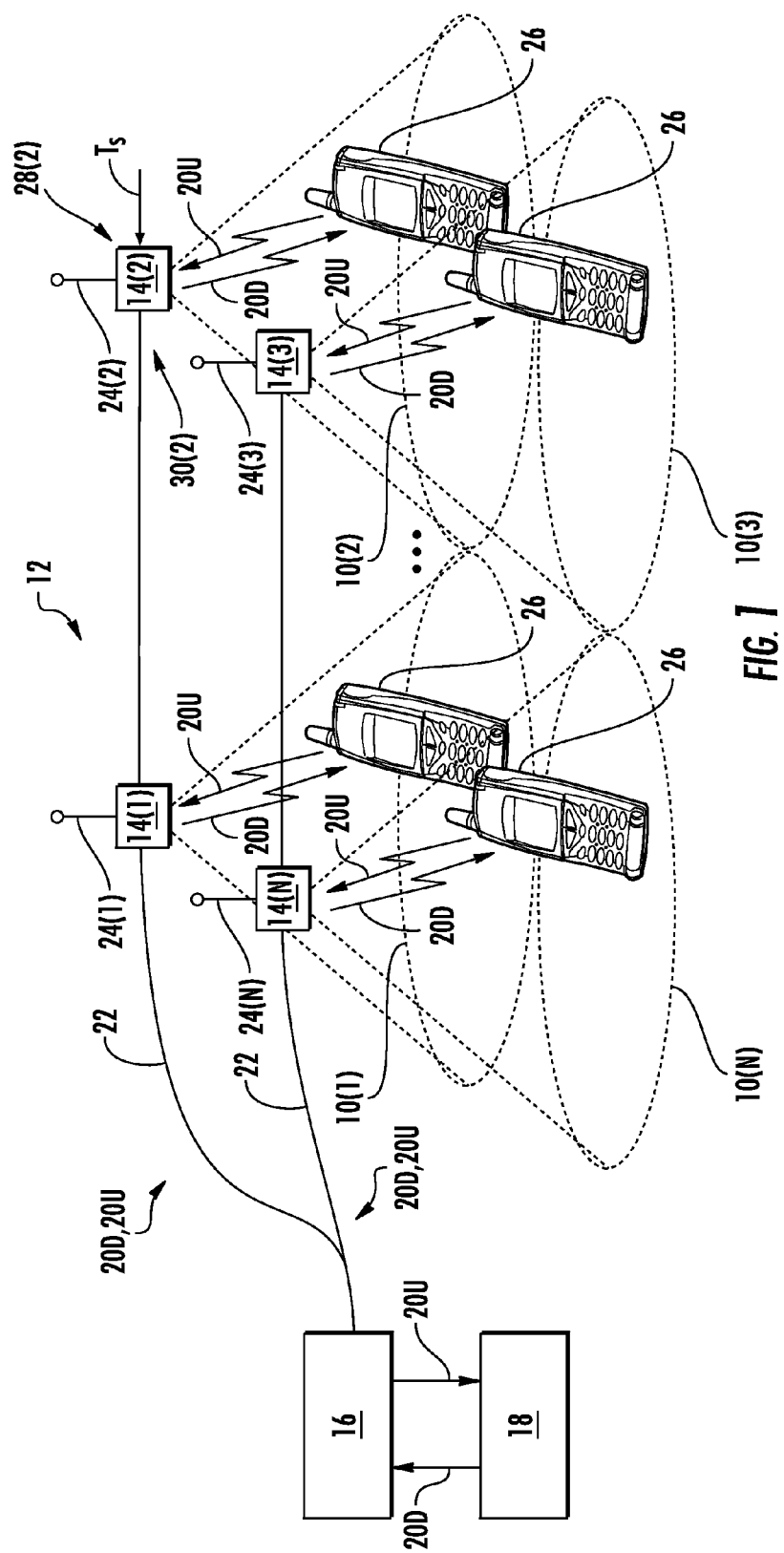
FIG. 1 is a schematic diagram of an exemplary distributed antenna system (DAS) capable of distributing radio frequency (RF) communications services to client devices.
Figure 2:
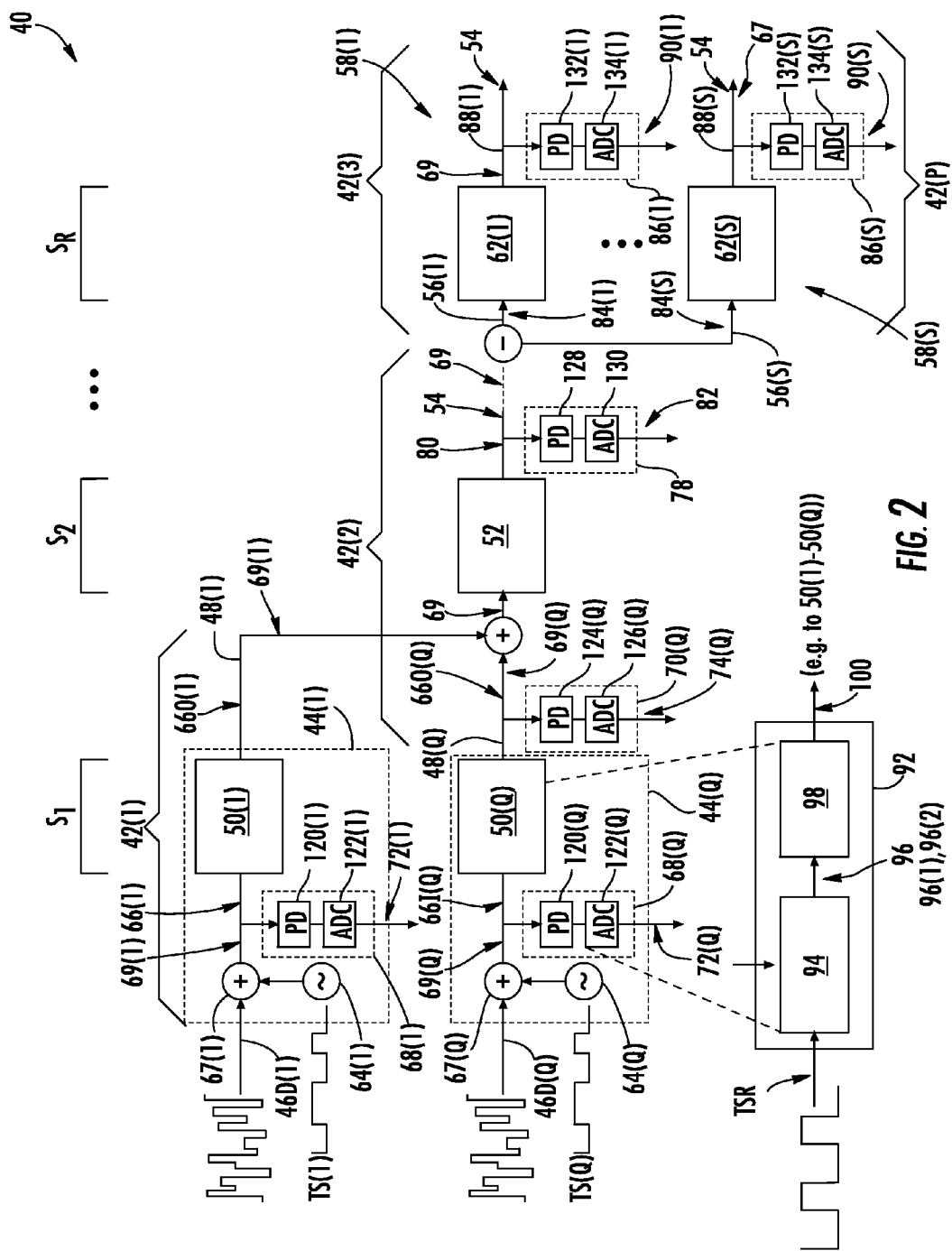
FIG. 2 is a schematic diagram of an exemplary DAS comprising a plurality of DAS segments and a gain measurement system configured to measure the gain of the DAS segments during active communications of communications service signals in the DAS.

In this regard, FIG. 2 is a schematic diagram of exemplary DAS segments 42(1)-42(P) that can be provided in an exemplary DAS 40. Note that FIG. 2 may not show an entire DAS, but portions that include the DAS segments 42(1)-42(P). As will be discussed in more detail below, the DAS 40 includes a gain measurement system configured to measure the gain of one or more DAS segments during active communications of communications service signals in the DAS 40. Before discussing the gain measurement system, the components of the DAS 40 in FIG. 2 will first be described below.

With reference to FIG. 2, a plurality of DAS segments 42(1)-42(P) are shown as included in the DAS 40. A DAS segment 42 can be any portion of a communication path and/or a DAS component in the DAS 40 that is involved with receiving and/or distributing communication service signals. For example, the DAS 40 may be comprised of staged DAS components, such as radio interface units 44(1)-44(Q) that are configured to receive downlink communications service signals 46D(1)-46D(Q) from a base station or other network device (not shown) in a first DAS stage $S_1$ of the DAS 40. The radio interface units 44(1)-44(Q) are configured to receive the respective downlink communications service signals 46D(1)-46D(Q) and distribute the downlink communications service signals 46D(1)-46D(Q) over communication downlinks 48(1)-48(Q) to one or more DAS components in a downstream DAS stage, which in FIG. 2 is shown as a second DAS stage $S_2$. Note that although the DAS 40 in FIG. 2 only illustrates the downlink communications service signals 46D(1)-46D(Q), note that radio interface units 44(1)-44(Q) are also configured to receive uplink communications service signals from the DAS components in the second DAS stage $S_2$ and distribute the uplink communications service signals to a base station or other network device (not shown). The radio interface units 44(1)-44(Q) have associated communications service signal handling components, such as amplifiers for example, that can cause gain or attenuation to occur in the downlink communications service signals 46D(1)-46D(Q). In this regard, the radio interface units 44(1)-44(Q) in this example have gain control circuits 50(1)-50(Q) that can adjust the gain of the downlink communications service signals 46D(1)-46D(Q).

With continuing reference to FIG. 2, the second DAS stage $S_2$ of the DAS 40 contains an additional DAS component 52. The DAS component 52 receives the downlink communications service signals 46D(1)-46D(Q) from each of the radio interface units 44(1)-44(Q) in this example. The DAS component 52 in this example combines the downlink communications service signals 46D(1)-46D(Q) received from the radio interface units 44(1)-44(Q) into a combined downlink communications service signal 54. The combined downlink communications service signal 54 is distributed by the DAS component 52 over a plurality of communication downlinks 56(1)-56(S) to a plurality of remote units 58(1)-58(S) in a last DAS stage $S_R$. For example, the remote units 58(1)-58(S) may be remote antenna units that are each configured to distribute the combined downlink communications service signal 54 to an antenna (not shown) for wireless distribution. The DAS component 52 and remote units 58(1)-58(S) each have associated communications service signal handling components, such as amplifiers and couplers for example, that can cause gain or attenuation to occur in the combined downlink communications service signal 54. In this regard, the DAS component 52 and remote units 58(1)-58(S) in this example have respective gain control circuits 60 and 62(1)-62(S) that can adjust the gain of the combined downlink communications service signal 54.

It may be desired to measure gain (i.e., attenuation) of one or more of the DAS segments 42(1)-42(P) of the DAS 40 in FIG. 2 and/or the DAS components contained therein to determine performance degradation. For example, the gain of a radio interface unit 44 may be significantly different from its nominal gain level due to component variance, temperature changes, aging, and/or loading conditions. In response, the gain control circuit 50 may be adjusted to adjust the actual gain of the radio interface unit back to the desired nominal gain level. In this regard, as an example, when the DAS 40 in FIG. 2 is first installed and all elements are interconnected and operated, it may be desired to measure the gain of each relevant DAS segment 42(1)-42(P), so that gain adjustments can be made.

In this regard, with reference to FIG. 2, a plurality of test signal generators 64(1)-64(Q) are provided. The plurality of test signal generators 64(1)-64(Q) may be included in each of the radio interface units 44(1)-44(Q), respectively, as shown in FIG. 2. The test signal generators 64(1)-64(Q) are each configured to inject a test signal $T_S(1)$-$T_S(Q)$ into the respective input node 66I(1)-66I(Q) to be combined via combiners 67(1)-67(Q) with a respective downlink communications service signal 46D(1)-46D(Q) to form combined signals 69(1)-69(Q). The combiners 67(1)-67(Q) may be included in each of the radio interface units 44(1)-44(Q), respectively, as shown in FIG. 2. In this manner, the downlink communications service signals 46D(1)-46D(Q) are present so that the DAS 40 can actively handle communications services during gain measurement. The test signal $T_S(1)$-$T_S(Q)$ has a frequency that is in a frequency band within the supported downlink communications service signals 46D(1)-46D(Q) so that the DAS components in the DAS 40 will not filter out the test signals $T_S(1)$-$T_S(Q)$. For example, to test the gain of the radio interface unit 44(Q) in the first DAS segment 42(1), the power of the test signal $T_S(Q)$ is detected by a first power detection circuit 68(Q) at the input node 66I(Q) of the radio interface unit 44(Q) and by a second power detection circuit 70(Q) at output node 66O(Q) of the radio interface unit 44(Q). The first power detection circuits 68(1)-68(Q) may be included in each of the radio interface units 44(1)-44(Q), respectively, as shown in FIG. 2. Further, the second power detection circuits 70(1)-70(Q) may be included in each of the radio interface units 44(1)-44(Q), respectively. The first power detection circuit 68(Q) and the second power detection circuit 70(Q) provide a first measurement signal 72(Q) and second measurement signal 74(Q), respectively. The first measurement signal 72(Q) and second measurement signal 74(Q) represent power-related measurements indicative of the detected power of the combined test signal $T_S(Q)$ and downlink communications service signal 46D(Q) at the input node 66I(Q) and output node 66O(Q), respectively, of the radio interface unit 44(Q) in this example. The difference between the first measurement signal 72(Q) and second measurement signal 74(Q) is the gain of the radio interface unit 44(Q). However, the first measurement signal 72(Q) and second measurement signal 74(Q) are measurements of a combined test signal $T_S(Q)$ and downlink communications service signal 44D(Q), not just the test signal $T_S(Q)$. Thus, normal fluctuations in power that occur in the downlink communications service signal 46D(Q) can cause the gain measurement of the radio interface unit 44(Q) to fluctuate and not represent the true gain.

With continuing reference to FIG. 2, note that the other DAS segments 42(2)-42(P) also contain power detection circuits that provide a measurement signal to represent power-related measurements indicative of the detected power of the combined test signal $T_S$ and downlink communications service signal 46D at an input node or an output node. For example, power detection circuit 78 is coupled to an output node 80 of the DAS component 52 to provide a measurement signal 82 to represent a power-related measurement indicative of the detected power of the combined test signal $T_S$ and downlink communications service signal 46D at the output node 80. The measurement signal 82 provided by the power detection circuit 78 can also be used to represent a power-related measurement indicative of the detected power of the combined test signal $T_S$ and downlink communications service signal 46D at the input nodes 84(1)-84(S) of the remote units 58(1)-58(S). A power-related measurement can be a direct measurement that indicates power, or an indirect measurement that can be translated or used to estimate power. Power detection circuits 86(1)-86(S) can also be coupled to each of the respective output nodes 88(1)-88(S) of the remote units 58(1)-58(S) (58(1)-58(S)) to provide a respective measurement signal 90(1)-90(S) representing a power-related measurement indicative of the detected power of the combined test signal $T_S$ and downlink communications service signal 46D at the output nodes 88(1)-88(S) of the remote units 58(1)-58(S). In summary, by providing power detection circuits coupled to each input and output node of the DAS components in the DAS 40, gain of any DAS segment 42(1)-42(P) or any combination thereof can be measured.

In this regard, to allow for gain measurement of any DAS segment 42(1)-42(P) or combination thereof in the DAS 40 in FIG. 2 during active communication periods, autocorrelation is employed to separate the test signals $T_S(1)$-$T_S(Q)$ from combined test signals $T_S(1)$-$T_S(Q)$ and respective downlink communications service signals 46D(1)-46D(Q). In this manner, gain measurements can be obtained of the test signals $T_S(1)$-$T_S(Q)$ to determine the gain of the desired DAS segment 42(1)-42(P) even though the test signals $T_S(1)$-$T_S(Q)$ and the downlink communications service signals 46D(1)-46D(Q) are combined in the DAS segments 42(1)-42(P) during gain measurement operations. Further, the autocorrelation examples discussed below can be employed to separate the test signals $T_S(1)$-$T_S(Q)$ from combined test signals $T_S(1)$-$T_S(Q)$ even though the test signals $T_S(1)$-$T_S(Q)$ may have significantly lower amplitude or power levels than the downlink communications service signals 46D(1)-46D(Q). For example, the test signal generators 64(1)-64(Q) may be configured to inject the test signals $T_S(1)$-$T_S(Q)$ at significantly lower amplitudes or power levels than the downlink communications service signals 46D(1)-46D(Q) to reduce or avoid interference between the test signals $T_S(1)$-$T_S(Q)$ and the downlink communications service signals 46D(1)-46D(Q).

In this regard, the DAS 40 in FIG. 2 includes a DAS segment gain measurement system 92. The DAS segment gain measurement system 92 includes a signal correlator 94 to separate a test signal $T_S$ from a downlink communications service signal 46D. Note that the signal correlator 94 may be a dedicated circuit or may be implemented in a controller, such as a microprocessor, as examples. In the example above, the signal correlator 94 can be configured to receive a measurement signal 72, 74, 82, 90 from a power detection circuit 68, 70, 78, 86. The signal correlator 94 is also configured to receive a test replication signal $T_{SR}$ that replicates a test signal $T_S$ generated by a test signal generator 64. The signal correlator 94 in this example is configured to autocorrelate a received measurement signal 72, 74, 82, 90 with the test replication signal $T_{SR}$ to separate out the downlink communications service signal 46D and generate a test measurement signal 96 indicative of the power in the test signal $T_S$ component of the received measurement signal 72, 74, 82, 90. Autocorrelation is the cross-correlation of a signal with itself to observe similarities as a function of time lag. Autocorrelation is a mathematical tool that can be used for finding repeating patterns, such as the presence of a periodic signal, which in this example the test replication signal $T_{SR}$, obscured by noise or other signal, which in this example would be the downlink communications service signal 46D.

With continuing reference to FIG. 2, the test measurement signal 96 can then be provided to a controller 98. If the signal correlator 94 is provided as part of the controller 98, the test measurement signal 96 is an internal signal or value of the test measurement indicative of the power in the test signal $T_S$ component of the received measurement signal 72, 74, 82, 90. Thus, to measure gain of a particular DAS segment 42(1)-42(P), at least two (i.e., a first and second) measurement signals 72, 74, 82, 90 are provided to the signal correlator 94. In this manner, the signal correlator 94 can provide two test measurement signals 96(1), 96(2), one for an input node and another for an output node, to the controller 98. The controller 98 receives the first and second test measurement signals 96(1), 96(2) and subtracts the first test measurement signal 96(1) from the second test measurement signals 96(2) to determine a gain of the measured DAS segment 42(1)-42(P). As one non-limiting example, the controller 98 can then generate the gain control signal 100 to be communicated to an appropriate gain control circuit 50(1)-50(Q), 60, 62(1)-62(S) of a DAS component to adjust the gain therein, as desired or needed.

Figure 3:
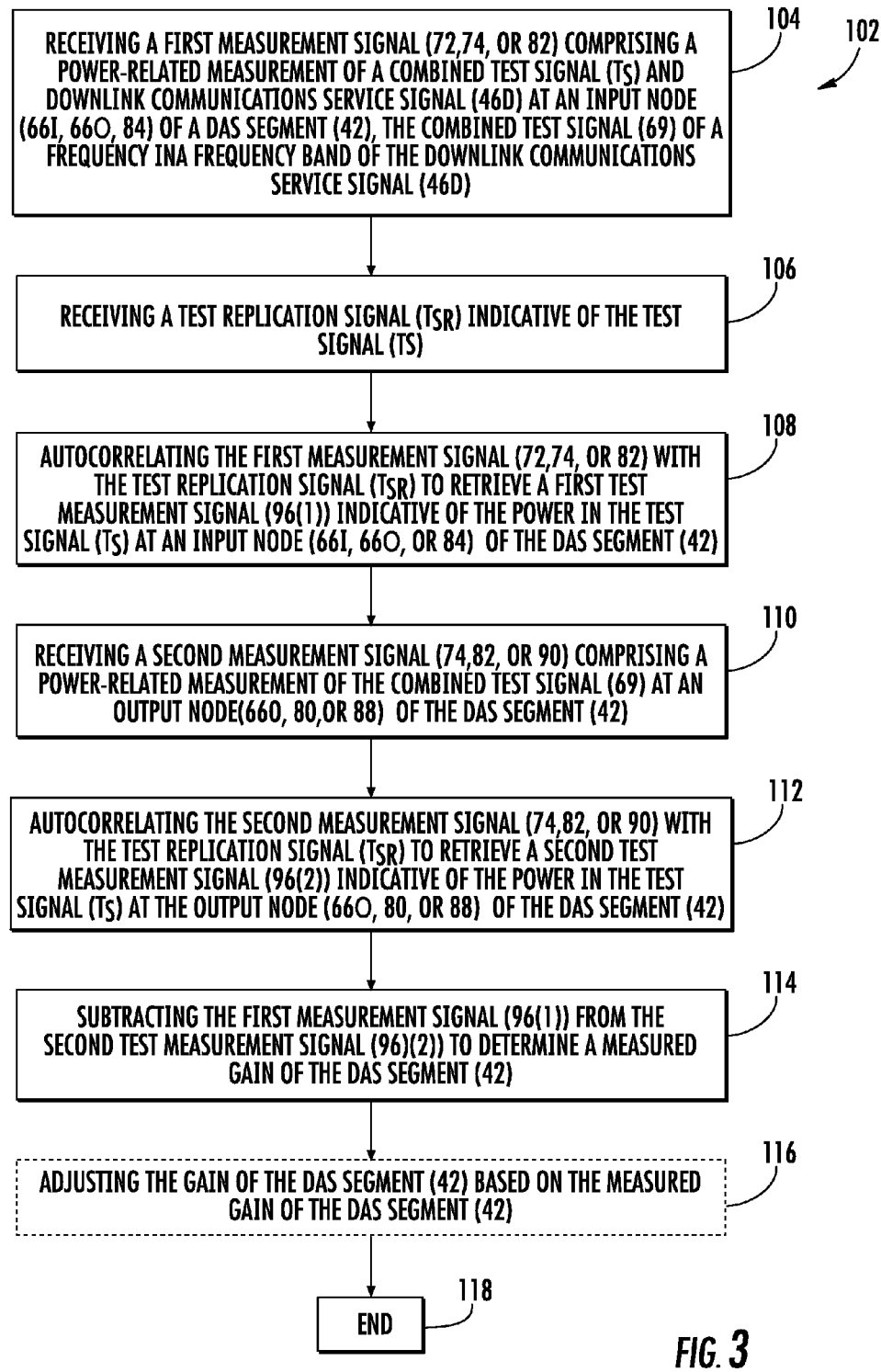
FIG. 3 is a flowchart illustrating an exemplary process of the gain measurement system in FIG. 2 measuring the gain of DAS segments during active communications employing an injected test signal having a frequency in a frequency band in the communications service signals supported by the DAS segments.

To further explain an exemplary operation of the gain measurement system 92 in the DAS 40 of FIG. 2, the flowchart in FIG. 3 is provided. FIG. 3 is a flowchart illustrating an exemplary process 102 of the gain measurement system 92 in FIG. 2 measuring the gain of selected DAS segments 42(1)-42(P) during active communications. As discussed above, the controller 98 directs the desired test signal generator(s) 64(1)-64(Q) to inject the test signal $T_S$ into the respective downlink communications service signal 46D(1)-46D(Q). The corresponding power detection circuits 68(1)-68(Q), 70(1)-70(Q), 82, or 86(1)-86(S) provide a respective measurement signal 72(1)-72(Q), 74(1)-74(Q), 82, 90(1)-90(S). As provided in FIG. 3, the signal correlator 94 receives the first measurement signal 72, 74, or 82 of a desired input node 66I, 66O, or 84 of the DAS segment 42 (block 104). The signal correlator 94 receives the test replication signal $T_{SR}$ (block 106). The signal correlator 94 autocorrelates the first measurement signal 72, 74, or 82 with the test replication signal $T_{SR}$ to retrieve the first test measurement signal 96(1) indicative of the power in the test signal Ts at an input node 66I, 66O, or 84 of the desired DAS segment 42 (block 108). The signal correlator 94 in this example also later receives the second measurement signal 74, 82, or 90 of a desired output node 66O, 80, or 88 of the DAS segment 42 (block 110). The signal correlator 94 autocorrelates the second measurement signal 74, 82, or 90 with the test replication signal $T_{SR}$ to retrieve the second test measurement signal 96(2) indicative of the power in the test signal Ts at an output node 66O, 80, or 88 of the desired DAS segment 42 (block 112).

With continuing reference to FIG. 3, the controller 98 receives and subtracts the first test measurement signal 96(1) from the second test measurement signal 96(2) to determine a measured gain of the selected DAS segment 42 (block 114). The controller 98 can then optionally send a gain control signal 100 to the appropriate gain control circuit 50(1)-50(Q), 60, 62(1)-62(S) of a DAS component to adjust the gain therein, as desired or needed (block 116), and the process ends (block 118). The process 102 can be initiated or repeated as desired, because as discussed above, the correlation methods provided in the DAS segment gain measurement system 92 allow gain measurements when the DAS 40 is active or not actively distributing communications service signals.

With reference back to the DAS 40 in FIG. 2, note that the controller 98 is provided in the DAS segment gain measurement system 92 as a standalone controller. However, the controller 98 that receives the test measurement signal 96 from the signal correlator 94 could be provided as part of another DAS component, for example, a radio interface unit 44 or the second DAS component 52 as examples. The controller 98 could also be provided as part of a central unit not shown in which the radio interface units 44(1)-44(Q) and/or the second DAS component 52 are physically disposed.

Further with reference to the DAS 40 in FIG. 2, note that in this example, the power detection circuits 68(1)-68(Q) each include a power detector 120(1)-120(Q) and analog-to-digital converters (ADC) 122(1)-122(Q). Similarly, the other power detection circuits 70(1)-70(Q), 78, 86(1)-86(S) include respective power detectors 124(1)-124(Q), 128, 132(1)-132(S) and ADCs 126(1)-126(Q), 130, 134(1)-134(S). The ADCs 126(1)-126(Q), 130, 134(1)-134(S) are configured to sample the measurement signals provided by the power detection circuit 70(1)-70(Q), 78, 86(1)-86(S) and provide the measurement signals 74(1)-74(Q), 82, 90(1)-90(S) as digital power measurement signals to the DAS segment gain measurement system 92. In this example, the signal correlator 94 is configured to correlate the measurement signals 72(1)-72(Q), 74(1)-74(Q), 82, 90(1)-90(S) as digital signals with the replication test signal $T_{SR}$ to generate the test measurement signal 96. As another non-limiting example, the ADC elements 122 may also be physically located inside the controller 98 system or component.

Further, the power detectors 120(1)-120(Q), 124(1)-124(Q), 128, 132(1)-132(S) and ADCs 122(1)-122(Q), 126(1)-126(Q), 130, 134(1)-134(S) may be configured to not actually detect power in a combined signal 69, but rather the voltage level as a power-related indication. Thus, the measurement signals 72(1)-72(Q), 74(1)-74(Q), 82, 90(1)-90(S) would represent voltage level measurements in this example. In this example, the controller 98 could be configured to correlate the voltage level measurements in the measurement signals 72(1)-72(Q), 74(1)-74(Q), 82, 90(1)-90(S) to a power measurement. For example, if the controller 98 was aware of the impedance Z of the node of the DAS segment 42 in which the measurement signals 72(1)-72(Q), 74(1)-74(Q), 82, 90(1)-90(S) originated, the controller 98 could convert the voltage level measurement of the measurement signals 72(1)-72(Q), 74(1)-74(Q), 82, 90(1)-90(S) according to the formula Power=$Vi^2/Zi$, where Vi is equal to the voltage measurement signals 72(1)-72(Q), 74(1)-74(Q), 82, 90(1)-90(S), and Zi is the impedance of the node of the DAS segment 42. Alternatively, the controller 98 could employ a conversion database 136 like provided in FIG. 4 as an example, wherein the digital value of a digital measurement signal 72(1)-72(Q), 74(1)-74(Q), 82, 90(1)-90(S) could be used to look-up a digital value 137 in the conversion database 136. The power level 138 represented by the digital measurement signal 72(1)-72(Q), 74(1)-74(Q), 82, 90(1)-90(S) could then be determined from a corresponding power level stored in a voltage level, power level pair in the conversion database 136.

In the DAS segment gain measurement system 92 in the DAS segments 42(1)-42(P) in FIG. 2, only one signal correlator 94 is provided. Thus, the measurement signals 72(1)-72(Q), 74(1)-74(Q), 82, 90(1)-90(S) must be provided to the DAS segment gain measurement system 92 with timing that does not cause interference between any of the measurement signals 72(1)-72(Q), 74(1)-74(Q), 82, 90(1)-90(S) for an input node and an output node of a DAS segment 42 for gain to be measured. However, it is possible to provide a gain measurement system with two signal correlators 94 to avoid the potential for interference in received measurement signals 72(1)-72(Q), 74(1)-74(Q), 82, 90(1)-90(S).

Figure 5:
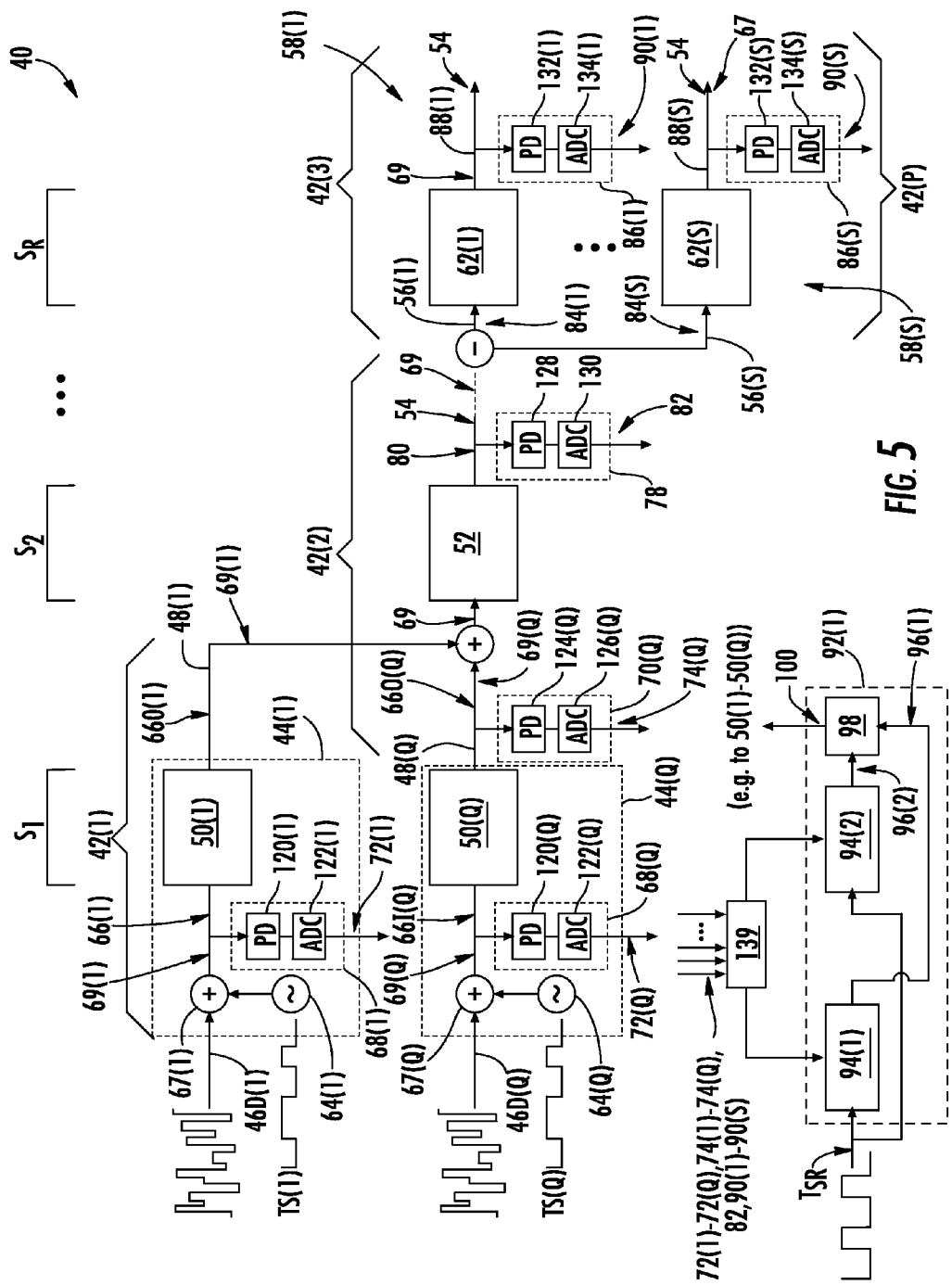
FIG. 5 is schematic diagram of the exemplary DAS comprising a plurality of DAS segments in FIG. 2 and another exemplary gain measurement system configured to measure the gain of the DAS segments during active communications of communications service signals in the DAS.

In this regard, FIG. 5 is schematic diagram of the DAS segments 42(1)-42(P) in FIG. 2, but with an alternative DAS segment gain measurement system 92(1). In this embodiment, a first signal correlator 94(1) and a second signal correlator 94(2) are provided in the DAS segment gain measurement system 92(1). Both the first signal correlator 94(1) and the second signal correlator 94(2) are configured to operate just as the signal correlator 94 in the DAS segment gain measurement system 92 in FIG. 2. However, the first signal correlator 94(1) and the second signal correlator 94(2) are each configured to separately provide their respective test measurement signals 96(1), 96(2) to the controller 98. A signal switch 139 is provided that is configured to receive each of the measurement signals 72(1)-72(Q), 74(1)-74(Q), 82, 90(1)-90(S) from the power detection circuits 68(1)-68(Q), 70(1)-70(Q), 78, 86(1)-86(S) and switch one of the measurement signals 72(1)-72(Q), 74(1)-74(Q), 82, 90(1)-90(S) for an input node of a DAS segment 42 to the first signal correlator 94(1) and another of the measurement signals 72(1)-72(Q), 74(1)-74(Q), 82, 90(1)-90(S) for an output node of a DAS segment 42 to the second signal correlator 94(2). In this manner, each of the first and second signal correlators 94(1), 94(2) can autocorrelate their respective received measurement signal 72(1)-72(Q), 74(1)-74(Q), 82, 90(1)-90(S) with the replication test signal $T_{SR}$ to provide the first and second test measurement signals 96(1), 96(2) to the controller 98 without interfering with each other. The signal switch 139 may be under control of the controller 98 or other controller to select which DAS segment 42 will be measured for gain, by selecting the appropriate measurement signal 72(1)-72(Q), 74(1)-74(Q), 82, 90(1)-90(S) to provide to the first and second signal correlators 94(1), 94(2).

Figure 6:
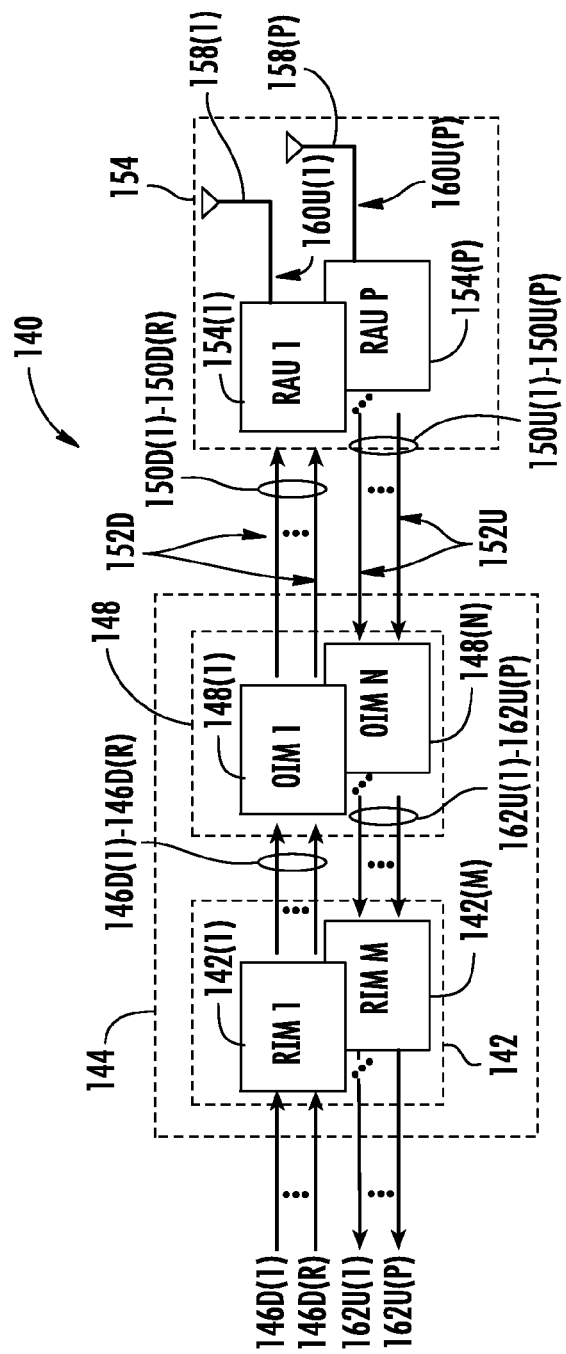
FIG. 6 is a schematic diagram of an exemplary optical fiber-based DAS that can include the gain test measurement system in FIGS. 2 and 5 to measure the gain of the DAS segments during active communications of communications service signals in the DAS.

The gain measurement systems disclosed herein can be provided in other DASs other than DAS 40 in FIGS. 2 and 5, respectively. For example, FIG. 6 is a schematic diagram of another exemplary optical fiber-based DAS 140 that may be include the gain measurement systems 92, 92(1) discussed above. In this embodiment, the optical fiber-based DAS 140 includes optical fiber for distributing communications services. The optical fiber-based DAS 140 in this embodiment is comprised of three (3) main components. One or more radio interfaces provided in the form of radio interface modules (RIMs) 142(1)-142(M) in this embodiment are provided in a central unit 44 to receive and process downlink electrical communications signals 146D(1)-146D(R) prior to optical conversion into downlink optical communications signals. The RIMs 142(1)-142(M) provide both downlink and uplink interfaces. The notations "1-R" and "1-M" indicate that any number of the referenced component, 1-R and 1-M, respectively, may be provided. The central unit 144 is configured to accept the plurality of RIMs 142(1)-142(M) as modular components that can easily be installed and removed or replaced in the central unit 144. In one embodiment, the central unit 144 is configured to support up to twelve (12) RIMs 142(1)-142(12).

Each RIM 142(1)-142(M) can be designed to support a particular type of radio source or range of radio sources (i.e., frequencies) to provide flexibility in configuring the central unit 144 and the optical fiber-based DAS 140 to support the desired radio sources. For example, one RIM 142 may be configured to support the Personal Communication Services (PCS) radio band. Another RIM 142 may be configured to support the 700 MHz radio band. In this example, by inclusion of these RIMs 142, the central unit 144 could be configured to support and distribute communications signals on both PCS and LTE 700 radio bands, as an example. RIMs 142 may be provided in the central unit 144 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 142 may also be provided in the central unit 144 that support any wireless technologies desired, including but not limited to Code Division Multiple Access (CDMA), CDMA200, 1xRTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 142 may be provided in the central unit 144 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical communications signals 146D(1)-146D(R) are provided to a plurality of optical interfaces provided in the form of optical interface modules (OIMs) 148(1)-148(N) in this embodiment to convert the downlink electrical communications signals 146D(1)-146D(R) into downlink optical communications signals 150D(1)-150D(R). The notation "1-N" indicates that any number of the referenced component 1-N may be provided. The OIMs 148 may be configured to provide one or more optical interface components (OICs) that contain optical to electrical (O/E) and electrical to optical (E/O) converters, as will be described in more detail below. The OIMs 148 support the radio bands that can be provided by the RIMs 142, including the examples previously described above. Thus, in this embodiment, the OIMs 148 may support a radio band range from 400 MHz to 2700 MHz, as an example.

The OIMs 148(1)-148(N) each include E/O converters to convert the downlink electrical communications signals 146D(1)-146D(R) into the downlink optical communications signals 150D(1)-150D(R). The downlink optical communications signals 150D(1)-150D(R) are communicated over downlink optical fiber(s) 152D to a plurality of remote antenna units 154(1)-154(P). The notation "1-P" indicates that any number of the referenced component 1-P may be provided. O/E converters provided in the remote antenna units 154(1)-154(P) convert the downlink optical communications signals 150D(1)-150D(R) back into the downlink electrical communications signals 146D(1)-146D(R), which are provided to antennas 158(1)-158(P) in the remote antenna units 154(1)-154(P) to client devices in the reception range of the antennas 158(1)-158(P).

E/O converters are also provided in the remote antenna units 154(1)-154(P) to convert uplink electrical communications signals 160U(1)-160U(P) received from client devices through the antennas 158(1)-158(P) into uplink optical communications signals 150U(1)-150U(P) to be communicated over uplink optical fibers 152U to the OIMs 148(1)-148(N). The OIMs 148(1)-148(N) include O/E converters that convert the uplink optical communications signals 150U(1)-150U(P) into uplink electrical communications signals 162U(1)-162U(P) that are processed by the RIMs 142(1)-142(M) and provided as uplink electrical communications signals 162U(1)-162U(P).

Figure 7:
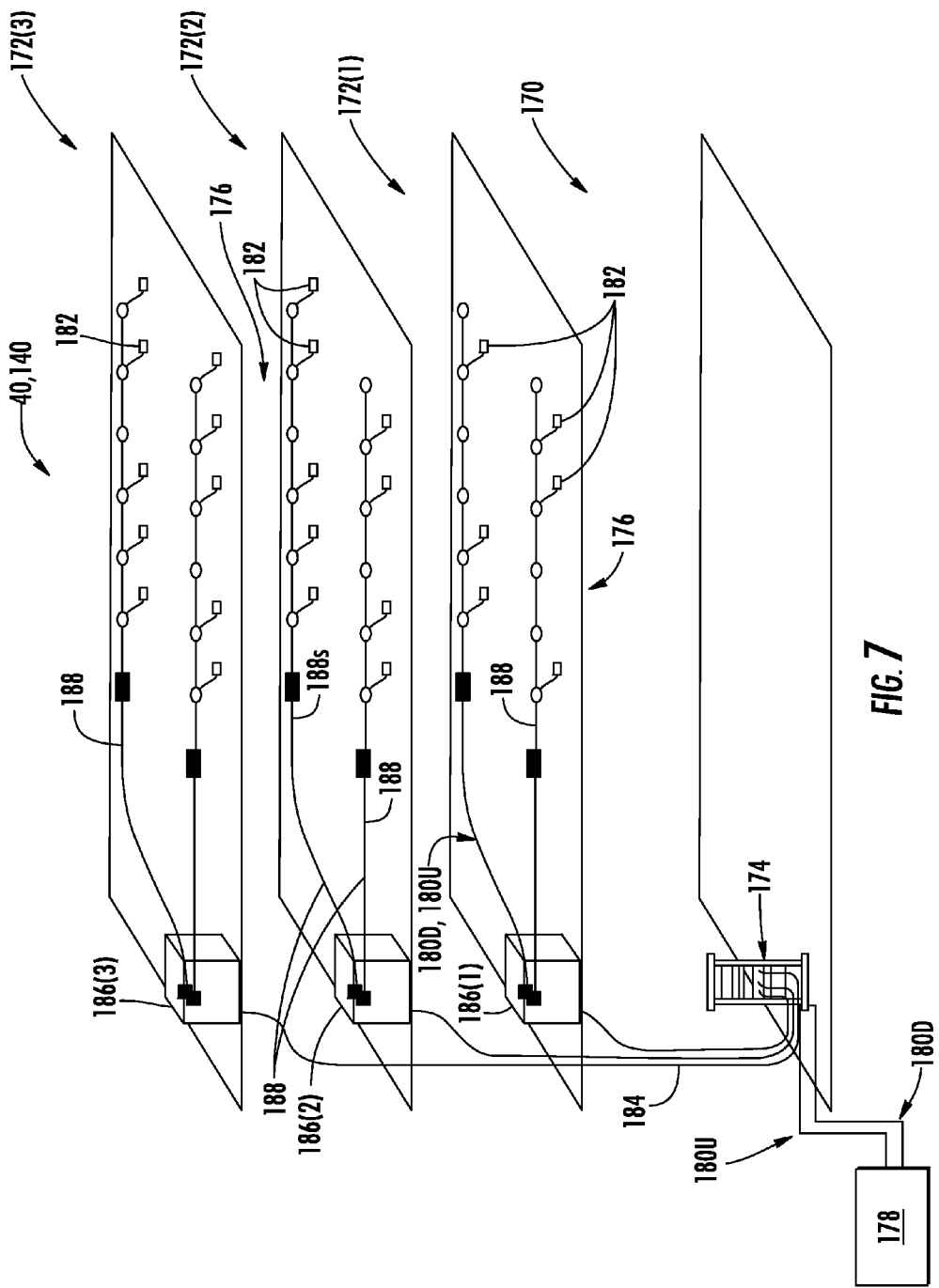
FIG. 7 is a partially schematic cut-away diagram of an exemplary building infrastructure in which the DAS in FIG. 6 can be employed.

The DAS 140 in FIG. 6 may also be provided in an indoor environment, as illustrated in FIG. 7. FIG. 7 is a partially schematic cut-away diagram of a building infrastructure 170 employing the DASs 40, 140 described herein. The building infrastructure 170 in this embodiment includes a first (ground) floor 172(1), a second floor 172(2), and a third floor 172(3). The floors 172(1)-172(3) are serviced by the central unit 174 to provide the antenna coverage areas 176 in the building infrastructure 170. The central unit 174 is communicatively coupled to the base station 178 to receive downlink communications signals 180D from the base station 178. The central unit 174 is communicatively coupled to the remote antenna units 182 to receive the uplink communications signals 180U from the remote antenna units 182, as previously discussed above. The downlink and uplink communications signals 180D, 180U communicated between the central unit 174 and the remote antenna units 182 are carried over a riser cable 184. The riser cable 184 may be routed through interconnect units (ICUs) 186(1)-186(3) dedicated to each floor 172(1)-172(3) that route the downlink and uplink communications signals 180D, 180U to the remote antenna units 182 and also provide power to the remote antenna units 182 via array cables 188.

Figure 8:
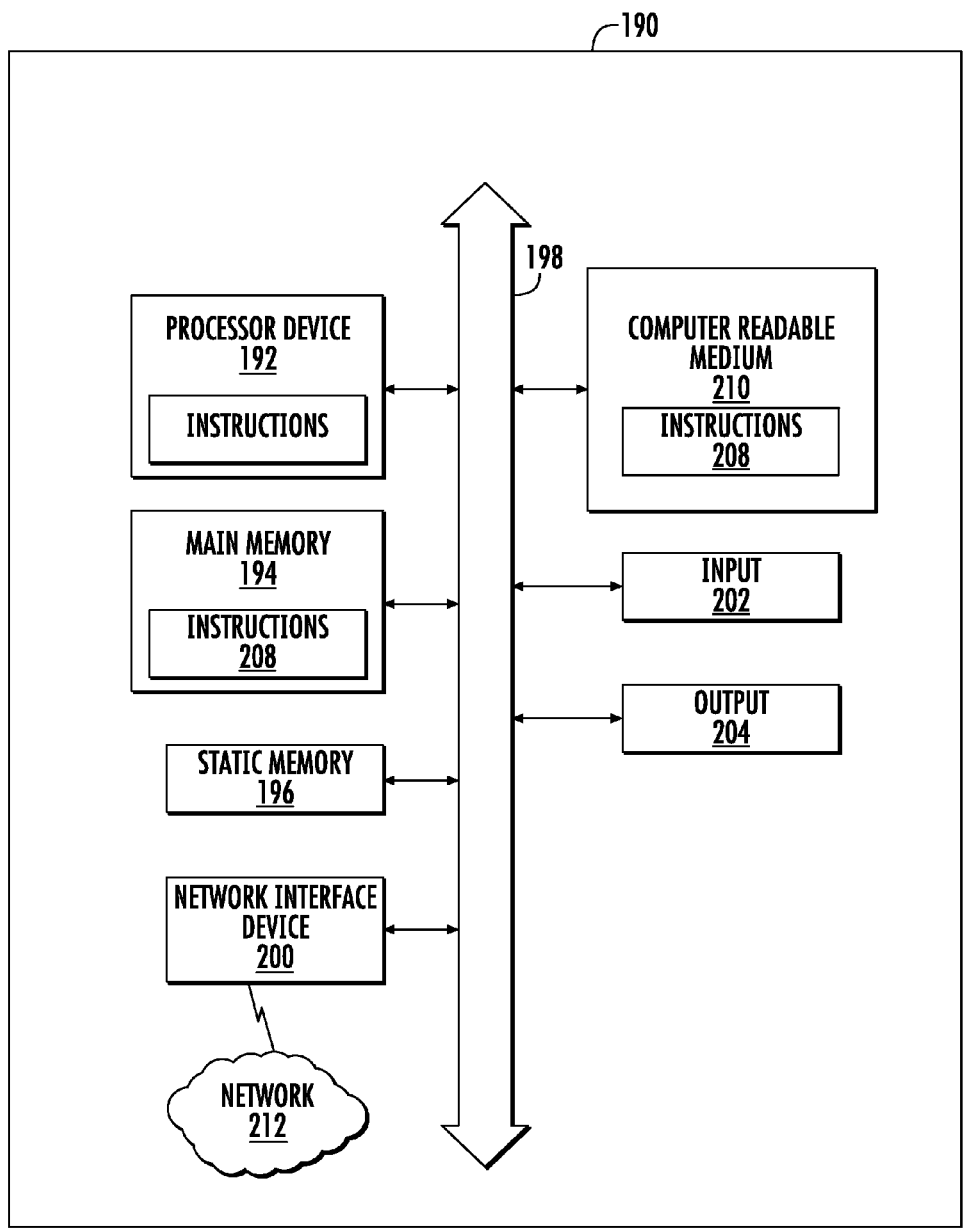
FIG. 8 is a schematic diagram of a generalized representation of an exemplary controller.

FIG. 8 is a schematic diagram representation of additional detail illustrating a computer system 190 that could be employed in a gain measurement system as a controller or other control means to measure gain of a DAS segment 42. The control system 190 is adapted to execute instructions from an exemplary computer-readable medium to perform these and/or any of the functions or processing described herein.

In this regard, the computer system 190 in FIG. 8 may include a set of instructions that may be executed to calculate gain of DAS segment in a DAS. The computer system 190 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 190 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 190 in this embodiment includes a processing device or processor 192, a main memory 194 (e.g., read-only memory (ROM), flash memory, dynamic random access memory (DRAM), such as synchronous DRAM (SDRAM), etc.), and a static memory 196 (e.g., flash memory, static random access memory (SRAM), etc.), which may communicate with each other via a data bus 198. Alternatively, the processor 192 may be connected to the main memory 194 and/or static memory 196 directly or via some other connectivity means. The processor 192 may be a controller, and the main memory 194 or static memory 196 may be any type of memory.

The processor 192 represents one or more general-purpose processing devices, such as a microprocessor, central processing unit, or the like. More particularly, the processor 192 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 192 is configured to execute processing logic in instructions for performing the operations and steps discussed herein.

The computer system 190 may further include a network interface device 200. The computer system 190 also may or may not include an input 202, configured to receive input and selections to be communicated to the system 190 when executing instructions. The system 190 also may or may not include an output 204, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 190 may or may not include a data storage device that includes instructions 208 stored in a computer-readable medium 210. The instructions 208 may also reside, completely or at least partially, within the main memory 194 and/or within the processor 192 during execution thereof by the system 190, the main memory 194 and the processor 192 also constituting computer-readable medium. The instructions 208 may further be transmitted or received over a network 212 via the network interface device 200.

While the computer-readable medium 210 is shown in an exemplary embodiment to be a single medium, the term "computer-readable medium" shall include a single medium or multiple media (e.g., a centralized or distributed database, and/or associated caches and servers) that store the one or more sets of instructions, or any medium that is capable of storing, encoding, or carrying a set of instructions for execution by the processing device and that cause the processing device to perform any one or more of the methodologies of the embodiments disclosed herein, or solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described in any of the embodiments herein are described to provide examples and discussion. The operations described may be performed in numerous different sequences other than the illustrated sequences. Operations described in a single operational step may actually be performed in a number of different steps. One or more operational steps discussed in the exemplary embodiments may be combined.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed antenna system (DAS) segment gain measurement system, comprising:
   a signal correlator configured to:
      receive a first measurement signal comprising a power-related measurement of a combined test signal and communications service signal at an input node of a DAS segment, the combined test signal of a frequency in a frequency band of the communications service signal;
      receive a test replication signal indicative of the test signal;
      autocorrelate the first measurement signal with the test replication signal to retrieve a first test measurement signal indicative of the power in the test signal at the input node of the DAS segment;
      provide the first test measurement signal at the input node to a controller;

receive a second measurement signal comprising a power-related measurement of the combined test signal at an output node of the DAS segment;
autocorrelate the second measurement signal with the test replication signal to retrieve a second test measurement signal indicative of the power in the test signal at the output node of the DAS segment;
provide the second test measurement signal at the input node to a controller;
a controller configured to:
receive the first test measurement signal;
receive the second test measurement signal; and
subtract the first test measurement signal from the second test measurement signal to determine a measured gain of the DAS segment.

2. The DAS segment gain measurement system of claim 1, wherein the controller is further configured to adjust the gain of the DAS segment based on the measured gain of the DAS segment.

3. The DAS segment gain measurement system of claim 1, wherein the controller comprises the signal correlator.

4. The DAS segment gain measurement system of claim 1, further comprising:
a first power detection circuit comprising a first power detector coupled to the input node of the DAS segment, the first power detector configured to:
detect the power in the combined test signal at the input node of the DAS segment; and
provide the first measurement signal indicative of the detected power in the combined test signal at the input node of the DAS segment; and
a second power detection circuit comprising a second power detector coupled to the output node of the DAS segment, the second power detector configured to:
detect the power in the combined test signal at the output node of the DAS segment; and
provide the second measurement signal indicative of the detected power in the combined test signal at the output node of the DAS segment.

5. The DAS segment gain measurement system of claim 4, further comprising:
a first analog-to-digital converter (ADC) configured to sample the first measurement signal to provide the first measurement signal comprising a digital first measurement signal; and
a second analog-to-digital converter (ADC) configured to sample the second measurement signal to provide the second measurement signal comprising a digital second measurement signal.

6. The DAS segment gain measurement system of claim 1, further comprising a test signal generator configured to:
generate the test signal; and
inject the test signal to the input node of the DAS segment.

7. The DAS segment gain measurement system of claim 1, wherein the signal correlator further comprises:
a first signal correlator configured to:
autocorrelate the first measurement signal with the test replication signal to retrieve a first test measurement signal indicative of the power in the test signal at the input node of the DAS segment; and
provide the first test measurement signal to the controller;
a second signal correlator configured to:
autocorrelate the second measurement signal with the test replication signal to retrieve a second test measurement signal indicative of the power in the test signal at the output node of the DAS segment; and
provide the first test measurement signal to the controller;
a signal switch configured to:
receive the first measurement signal;
receive the second measurement signal;
switch the first measurement signal to be provided to the first signal correlator; and
switch the second measurement signal to be provided to the second signal correlator.

8. The DAS segment gain measurement system of claim 1, wherein:
the power-related measurement of the combined test signal and communications service signal at the input node of the DAS segment comprises a voltage measurement of the combined test signal and communications service signal at the input node of the DAS segment; and
the power-related measurement of the combined test signal and communications service signal at the output node of the DAS segment comprises a voltage measurement of the combined test signal and the communications service signal at the output node of the DAS segment.

9. The DAS segment gain measurement system of claim 8, wherein the controller is further configured to:
convert the voltage measurement of the first test measurement signal to a first power test measurement signal; and
convert the voltage measurement of the second test measurement signal to a second power test measurement signal;
the controller configured to:
subtract the first power test measurement signal from the second power test measurement signal to determine a measured power gain of the DAS segment; and
adjust the gain of the DAS segment based on the measured power gain of the DAS segment.

10. The DAS segment gain measurement system of claim 9, further comprising:
a database comprising pre-calibrated correlated voltage measurement to power measurement data pairs;
wherein the controller is configured to:
convert the voltage measurement of the first test measurement signal to the first power test measurement signal by selecting the power measurement in a voltage measurement to power measurement data pair in the database corresponding to the voltage measurement of the first test measurement signal; and
convert the voltage measurement of the second test measurement signal to the second power test measurement signal by selecting the power measurement in a voltage measurement to power measurement data pair in the database corresponding to the voltage measurement of the second test measurement signal.

11. The DAS segment gain measurement system of claim 9, further comprising:
wherein the controller is configured to:
convert the voltage measurement of the first test measurement signal to the first power test measurement signal by calculating power according to $P=Vi^2/Zi$, where Vi is equal to the voltage measurement of the first test measurement signal, and Zi is the impedance at the input node of the DAS segment; and
convert the voltage measurement of the second test measurement signal to the second power test measurement signal by calculating power according to $P=Vo^2/Zo$, where Vo is equal to the voltage measurement of the second test measurement signal, and Zo is the impedance at the output node of the DAS segment.

12. The DAS segment gain measurement system of claim 1, wherein the DAS segment includes at least one of a remote antenna unit and a radio interface unit.

13. The DAS segment gain measurement system of claim 1, wherein the DAS segment includes an optical interface module.

14. A method of measuring gain in a distributed antenna system (DAS) segment, comprising:
receiving a first measurement signal comprising a power-related measurement of a combined test signal and communications service signal at an input node of a DAS segment, the combined test signal of a frequency in a frequency band of the communications service signal;
receiving a test replication signal indicative of the test signal;
autocorrelating the first measurement signal with the test replication signal to retrieve a first test measurement signal indicative of the power in the test signal at the input node of the DAS segment;
receiving a second measurement signal comprising a power-related measurement of the combined test signal at an output node of the DAS segment;
autocorrelating the second measurement signal with the test replication signal to retrieve a second test measurement signal indicative of the power in the test signal at the output node of the DAS segment; and
subtracting the first test measurement signal from the second test measurement signal to determine a measured gain of the DAS segment.

15. The method of claim 14, further comprising adjusting the gain of the DAS segment based on the measured gain of the DAS segment.

16. The method of claim 14, further comprising:
detecting the power in the combined test signal at the input node of the DAS segment;
providing the first measurement signal indicative of the detected power in the combined test signal at the input node of the DAS segment;
detecting the power in the combined test signal at the output node of the DAS segment; and
providing the second measurement signal indicative of the detected power in the combined test signal at the output node of the DAS segment.

17. The method of claim 14, further comprising:
sampling the first measurement signal to provide a first digital measurement signal; and
sampling the second measurement signal to provide second digital measurement signal; and
comprising:
autocorrelating the first digital measurement signal with the test replication signal to retrieve a first digital test measurement signal indicative of the power in the test signal at the input node of the DAS segment;
autocorrelating the second digital measurement signal with the test replication signal to retrieve a second digital test measurement signal indicative of the power in the test signal at the output node of the DAS segment;
subtracting the first digital test measurement signal from the second digital test measurement signal to determine a measured gain of the DAS segment; and
adjusting the gain of the DAS segment based on the measured gain of the DAS segment.

18. The method of claim 14, further comprising:
generating the test signal; and
injecting the test signal to the input node of the DAS segment.

19. The method of claim 14, wherein:
the power-related measurement of the combined test signal and the communications service signal at the input node of the DAS segment comprises a voltage measurement of the combined test signal and the communications service signal at the input node of the DAS segment; and
the power-related measurement of the combined test signal and the communications service signal at the output node of the DAS segment comprises a voltage measurement of the combined test signal and the communications service signal at the output node of the DAS segment.

20. The method of claim 19, further comprising:
converting the voltage measurement of the first test measurement signal to a first power test measurement signal; and
converting the voltage measurement of the second test measurement signal to a second power test measurement signal; and
wherein:
subtracting the first test measurement signal from the second test measurement signal to determine a measured gain of the DAS segment comprises subtracting the first power test measurement signal from the second power test measurement signal to determine a measured power gain of the DAS segment; and
adjusting the gain of the DAS segment based on the measured gain of the DAS segment comprises adjusting the gain of the DAS segment based on the measured power gain of the DAS segment.

21. A distributed antenna system (DAS), comprising:
a plurality of DAS segments each configured to distribute communications service signals by being configured to distribute downlink communications service signals towards a plurality of remote antenna units and distribute uplink communications service signals received from client devices towards a central unit;
the plurality of DAS segments each comprising an input node and an output node;
a test signal generator configured to:
generate a test signal of a frequency in a frequency band of the communications service signals; and
inject the test signal to the input node of the plurality of DAS segments;
a plurality of power detection circuits each coupled to an input node or an output node of a DAS segment, each of the plurality of power detection circuits configured to:
detect a power-related measurement of combined test signal and communications service signal; and
provide a measurement signal comprising a power-related measurement of a combined test signal and communications service signal;
a signal switch configured to:
receive a plurality of the measurement signals from each of the plurality of power detection circuits; and
selectively provide a measurement signal from a plurality of the power-related measurements of the combined test signal and communications service signals to a gain measurement system;
the gain measurement system configured to:
receive a first measurement signal at an input node of a DAS segment among the plurality of DAS segments;
autocorrelate the first measurement signal with a test replication signal of the test signal to retrieve a first test measurement signal indicative of the power in the test signal at the input node of the DAS segment;

receive a second measurement signal at an output node of the DAS segment;
autocorrelate the second measurement signal with the test replication signal to retrieve a second test measurement signal indicative of the power in the test signal at the output node of the DAS segment; and
a controller configured to subtract the first test measurement signal from the second test measurement signal to determine a measured gain of the DAS segment.

22. The DAS of claim 21, wherein the controller is further configured to adjust the gain of the DAS segment based on the measured gain of the DAS segment.

23. The DAS of claim 21, wherein the gain measurement system comprises:
a first signal correlator configured to:
autocorrelate the first measurement signal with the test replication signal to retrieve a first test measurement signal indicative of the power in the test signal at the input node of the DAS segment; and
provide the first test measurement signal to the controller;
a second signal correlator configured to:
autocorrelate the second measurement signal with the test replication signal to retrieve a second test measurement signal indicative of the power in the test signal at the output node of the DAS segment; and
provide the second test measurement signal to the controller;
the signal switch configured to:
receive the first measurement signal;
receive the second measurement signal;
selectively provide the first measurement signal to be provided to the first signal correlator; and
selectively provide the second measurement signal to be provided to the second signal correlator.

24. The DAS of claim 21, further comprising an analog-to-digital converter (ADC) configured to sample the measurement signal to provide the measurement signal comprising a first digital measurement signal.

25. The DAS of claim 21, wherein each of the measurement signals from the plurality of power detection circuits comprises a voltage measurement of the combined test signal and the communications service signal at the input node of the DAS segment.

26. The DAS of claim 25, wherein the controller is further configured to:
convert the voltage measurement of the first test measurement signal to a first power test measurement signal; and
convert the voltage measurement of the second test measurement signal to a second power test measurement signal;
the controller configured to:
subtract the first power test measurement signal from the second power test measurement signal to determine a measured power gain of the DAS segment; and
adjust the gain of the DAS segment based on the measured power gain of the DAS segment.

* * * * *